(12) United States Patent
Graf

(10) Patent No.: US 7,014,195 B2
(45) Date of Patent: Mar. 21, 2006

(54) SEALING PROFILE FOR A MOTOR VEHICLE

(75) Inventor: Thomas Graf, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/199,799

(22) Filed: Jul. 19, 2002

(65) Prior Publication Data

US 2003/0020241 A1  Jan. 30, 2003

(30) Foreign Application Priority Data

Jul. 25, 2001 (DE) .............................. 101 36 174

(51) Int. Cl.
*F16J 15/02* (2006.01)

(52) U.S. Cl. .................. 277/637; 277/641; 277/642; 277/644; 277/921

(58) Field of Classification Search ............... 277/637, 277/641, 642, 644, 921
See application file for complete search history.

(56) References Cited

U.S. PATENT DOCUMENTS

| | | | | |
|---|---|---|---|---|
| 2,607,966 A | * | 8/1952 | Beck ........................... 49/498.1 |
| 3,045,787 A | * | 7/1962 | Attwood ..................... 52/127.1 |
| 4,165,083 A | * | 8/1979 | Dochnahl .................... 277/642 |
| 4,193,605 A | * | 3/1980 | Josephson ................... 277/642 |
| 4,381,115 A | * | 4/1983 | Ko ............................... 49/498.1 |
| 4,447,065 A | * | 5/1984 | Dupuy et al. ............... 277/642 |
| 4,448,430 A | * | 5/1984 | Bright ......................... 277/642 |
| 4,546,986 A | * | 10/1985 | Roselli ........................ 277/642 |
| 4,614,347 A | * | 9/1986 | Kruschwitz ................. 277/641 |
| 4,756,944 A | * | 7/1988 | Kisanuki ..................... 428/122 |
| 4,819,381 A | | 4/1989 | Kitaura et al. |
| 4,843,763 A | * | 7/1989 | Mesnel ........................ 49/440 |
| 4,952,442 A | * | 8/1990 | Warner ........................ 428/83 |
| 4,976,067 A | * | 12/1990 | Maass ......................... 49/377 |
| 5,007,202 A | * | 4/1991 | Guillon ....................... 49/441 |
| 5,010,689 A | * | 4/1991 | Vaughan ..................... 49/440 |
| 5,032,444 A | * | 7/1991 | Desir, Sr. .................... 428/122 |
| 5,042,201 A | * | 8/1991 | Vaughn ..................... 49/482.1 |
| 5,050,349 A | * | 9/1991 | Goto et al. ................. 49/489.1 |
| 5,067,281 A | * | 11/1991 | Dupuy ........................ 49/502 |
| 5,423,147 A | * | 6/1995 | Dupuy ...................... 49/490.1 |
| 5,462,292 A | * | 10/1995 | Yamane ...................... 277/642 |
| 5,626,383 A | * | 5/1997 | Lee et al. ................. 296/146.9 |
| 5,649,405 A | * | 7/1997 | Morihara et al. .......... 52/716.1 |
| 5,974,739 A | * | 11/1999 | Corney ...................... 49/493.1 |
| 6,273,433 B1 | * | 8/2001 | Yu .............................. 277/629 |
| 6,460,861 B1 | * | 10/2002 | Castner ...................... 277/642 |

FOREIGN PATENT DOCUMENTS

| | | |
|---|---|---|
| DE | 28 27 372 | 1/1980 |
| DE | 44 41 346 | 3/1996 |
| DE | 297 12 859 | 5/1998 |
| DE | 199 45 868 | 1/2001 |
| EP | 0 712 749 | 5/1996 |
| JP | 10-44765 | 2/1998 |

* cited by examiner

*Primary Examiner*—Brian E. Glessner
*Assistant Examiner*—Carlos Lugo
(74) *Attorney, Agent, or Firm*—Kenyon & Kenyon

(57) ABSTRACT

A sealing profile between the body of a motor vehicle and a moveable window includes a receiving groove into which an edge side of the window, which side interacts with the sealing profile, enters during closure of the window, a profiled section forming the groove being subjected to deformation by the edge side until the sealing profile obtains it final shape. The profiled section has, on a side facing the window edge, a soft elastic sealing layer which is arranged on a harder supporting layer arranged behind it.

15 Claims, 2 Drawing Sheets

SEALING PROFILE FOR A MOTOR VEHICLE

FIELD OF THE INVENTION

The present invention relates to a sealing profile for a motor vehicle.

BACKGROUND INFORMATION

German Published Patent Application No. 199 45 868 describes a sealing profile for a motor vehicle between the body of the motor vehicle and a moveable window. The profile includes a receiving groove into which an edge side of the window, which side interacts with the sealing profile, enters during closure of the window. In the course of the entering procedure, a profiled section forming the groove is subjected to deformation by the edge side of the window until the sealing profile obtains a final shape. When the window is closed, the profiled section forming the groove firstly ensures that the window is supported against wind forces, for example, and secondly that the window is sealed. However, in order to obtain a good seal, the window has to be pressed against the profiled section with a relatively high press-on force. In order to apply this press-on force, the window winder therefore requires a relatively large driving force.

SUMMARY

An object of the present invention is, therefore, to provide a sealing profile which permits a reliable seal with a good support being retained even with a relatively low press-on force of the window.

The above and other beneficial objects of the present invention are achieved by providing a sealing profile as described herein.

In the case of the sealing profile according to the present invention, the profiled section has, on a side facing the window edge, a softer, elastic sealing layer, e.g., cellular rubber, etc. This enables a very good seal to be achieved even with a relatively low press-on force of the window against the profiled section, the soft sealing layer resting against the wide side and/or against the ground narrow side of the window. The harder supporting layer arranged behind it has, firstly, the supporting function for the sealing layer, which is softer relative to it, and, secondly, the supporting layer may ensure that the window is sufficiently supported against wind forces, for example.

DETAILED DESCRIPTION

Figure 1:
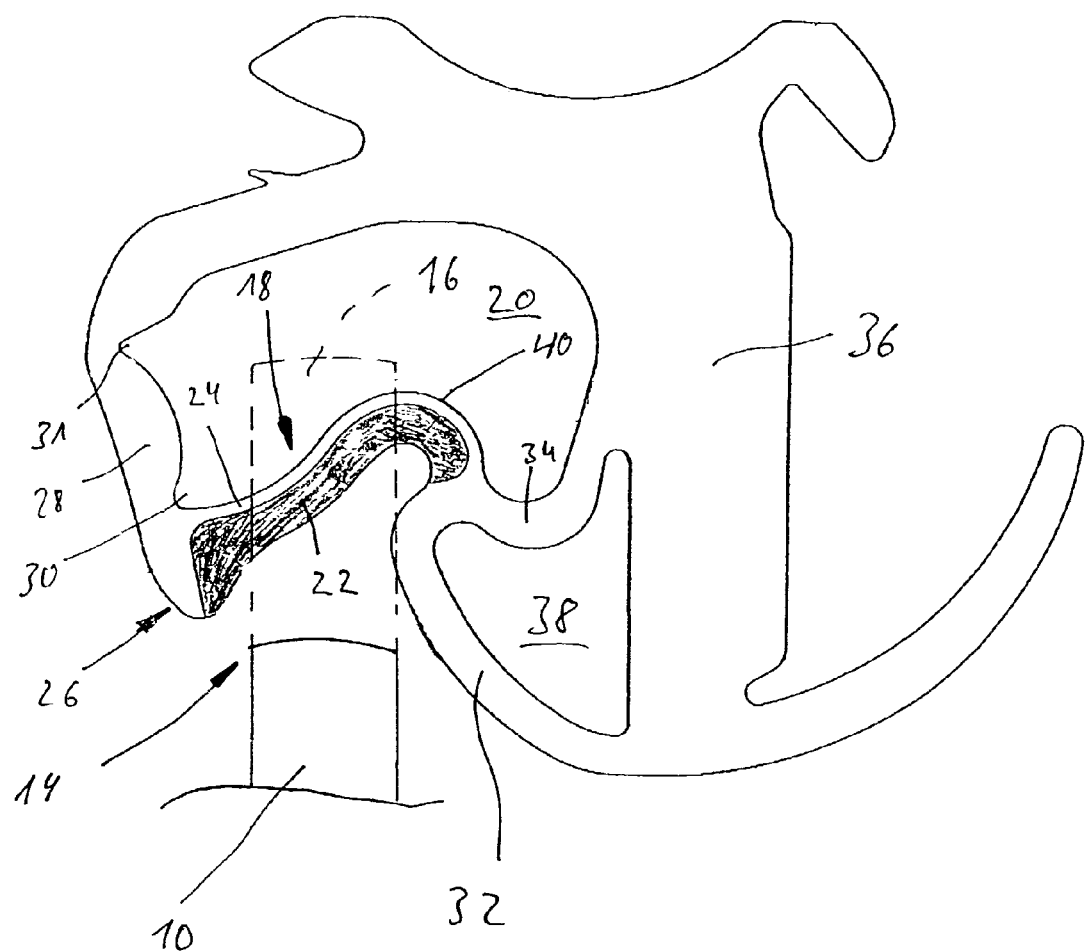
FIG. 1 is an enlarged schematic cross-sectional view through a sealing profile according to the present invention and a window.
Figure 2:
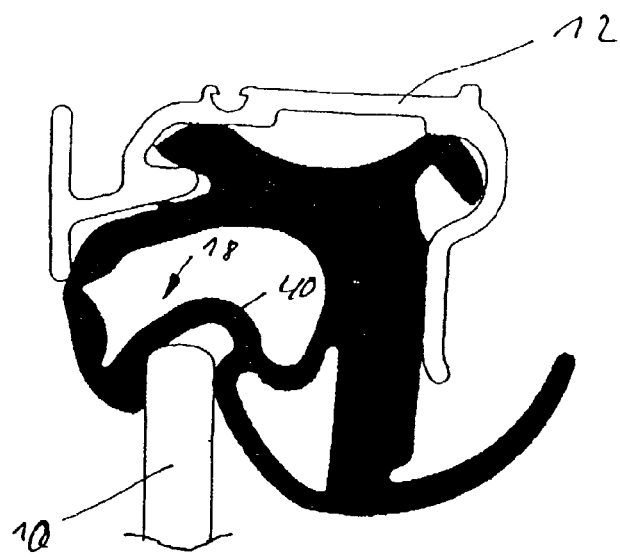
FIG. 2 is an enlarged schematic cross-sectional view through a sealing profile in a first entering phase of the window.
Figure 3:
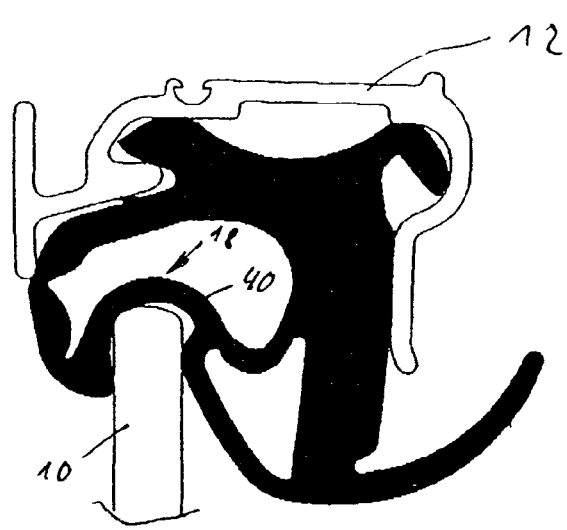
FIG. 3 is an enlarged schematic cross-sectional view through a sealing profile during the further course of the entering phase of the window.
Figure 4:
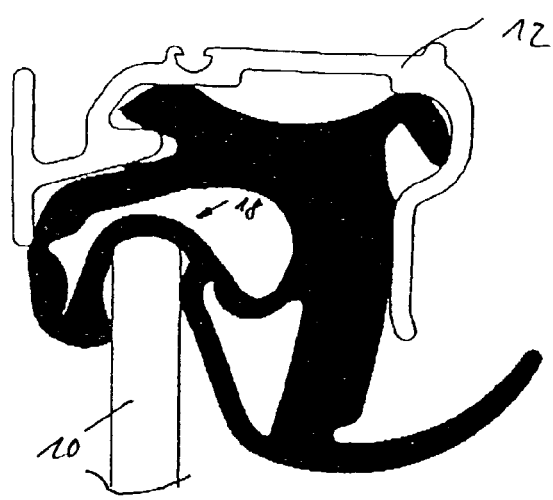
FIG. 4 is an enlarged schematic cross-sectional view through the sealing profile after the end of the entry of the window.

In FIG. 1, an enlarged schematic cross-section through a sealing profile between a body part of a motor vehicle and a moveable window 10 is illustrated. The exemplary embodiment illustrated involves the vertically moveable side window 10 of a frameless motor-vehicle door, the sealing profile being fastened on the side of the vehicle body to an A-pillar, as illustrated in FIGS. 2 to 4, or to a lateral roof member 12. It is also possible to insert the sealing profile between a side window and the frame profile of a door frame. FIG. 1 illustrates the position of the side window 10, part of which is illustrated, in a first entering phase into the sealing profile with solid lines and, after it has finished entering into the sealing profile, with dashed lines. In order to open and close the door, the window 10 is brought by a short-stroke control from the position indicated by dashed lines into the position illustrated by solid lines.

The sealing profile consists essentially of a customary, soft elastic material, for example a rubber compound, and includes a receiving groove 14 into which the edge side 16 of the window 10 enters. The receiving groove 14 is formed by a profiled section 18 which, during entry of the edge side 16, is acted upon such that a hollow chamber 20, which is arranged behind it in the direction of movement of the window, is pressed in during closure of the window 10. The profiled section 18 includes, on a side facing the window edge 16, a soft elastic sealing layer 22 which is arranged on a harder supporting layer 24, which is arranged behind the sealing layer 22, of the profiled section 18. The sealing layer 22 consists of "cellular rubber" or similar, relatively soft material. The harder supporting layer 24 consists of the same material as the sealing profile and is formed integrally with the latter. In this case, the supporting layer 24 has a constant width over the entire foot region of the receiving groove 14. The soft elastic sealing layer 22 is approximately two to four times the thickness of the supporting layer 24. The profiled section 18 is assigned a sealing projection 26 on a side region of the groove 14 which is on the outside of the vehicle, the sealing layer 22 extending as far as the inside of the sealing projection 26, which side faces the window 10. In an extension of the sealing projection 26, a side section 28 of the sealing profile is provided with two predetermined buckling points 30, 31, which will be explained, in particular with reference to FIGS. 2 to 4.

On the inside of the window 10, the sealing profile includes a window run-in section 32 which is supported on a main web 36 of the profile, which web extends approximately vertically, via a spring web 34. The window run-in section 32, the spring web 34 and the main web 36 bound a further hollow chamber 38. When the window 10 is moved upwardly, the edge region 16 slides along the window run-in section 32 into the groove 14 and is positioned as a result in a position transverse with respect to the direction of movement. This is assisted by the spring web 34 which is configured in terms of geometry such that the restoring forces of the window run-in section 32 on the edge region 16 remain virtually constant during the entire entering phase into the groove 14. As a result, a defined position of the window 10 when there are different entering tolerances of the window 10 in the transverse direction of the vehicle is achieved.

In FIGS. 2 to 4, the sealing profile is illustrated, in each case in enlarged schematic cross-section, in a first entering phase of the window 10, part of which is illustrated, into the groove 14, the further course of the entering phase and after the end of the entry of the window 10 into the groove 14.

When the profiled section 18 is moved in the direction of the hollow chamber 20, the sealing projection 26 is moved in the direction of the outer wide side of the window 10 and rests against the latter. This resting is assisted by the two predetermined buckling points 30, 31 in the side section 28. The soft sealing layer 22 provides a seal both to the smooth wide side and also to the ground narrow side. In this connection, a particularly good seal, in particular also against the effects of wind, is provided by the soft rubber compound of the sealing layer 22. In contrast, the somewhat harder rubber compound of the supporting layer 24 may ensure a good bond between the sealing profile and the window 10 against the wind forces which occur. In order to improve the compensation of tolerance, the profiled section 18 includes a loop section 40 which extends approximately as an extension of the window run-in section 32 and through which the window may enter into the groove 14 without the profiled section 18 having to be overstretched.

What is claimed is:

1. A sealing profile between a body of a motor vehicle and a moveable window, comprising:
    a receiving groove into which an edge side of the window that interacts with the sealing profile enters during closure of the window, a deformable profiled section having a continuous surface that forms the groove configured to be subjected to deformation by the edge side of the window until the sealing profile obtains a final shape, the deformable profiled section including two layers deformable by the edge side of the window, the two layers including a soft elastic sealing layer on a first side of the deformable profiled section facing the window edge and a harder supporting layer on a second side of the deformable profiled section opposite the first side of the deformable profiled section and facing away from the window edge, the soft elastic sealing layer arranged and supported directly on the harder supporting layer along an entire width of the deformable profiled section.

2. The sealing profile according to claim 1, wherein the profiled section forms a boundary wall of a hollow chamber configured to be pressed in during closure of the window.

3. The sealing profile according to claim 1, wherein the supporting layer has a constant width over an entire foot region of the receiving groove.

4. The sealing profile according to claim 1, wherein the deformable profiled section has, on a side region of the groove which is on an outside of the vehicle, a sealing projection configured to rest against a wide side of the window during closure thereof.

5. The sealing profile according to claim 4, wherein in an extension of the sealing projection a side section of the sealing profile includes two predetermined buckling points at which the side section is configured to buckle during closure of the window.

6. The sealing profile according to claim 1, further comprising a window run-in section supported on a main web via a spring web.

7. A sealing profile between a body of a motor vehicle and a moveable window, comprising:
    a receiving groove into which an edge side of the window that interacts with the sealing profile enters during closure of the window, a deformable profiled section having a continuous surface that forms the groove configured to be subjected to deformation by the edge side of the window until the sealing profile obtains a final shape, the deformable profiled section including two layers deformable by the edge side of the window, the two layers including on a first side facing the window edge a soft elastic sealing layer and on a second side opposite and behind the first side a harder supporting layer arranged on the soft elastic sealing layer along an entire width of the soft elastic sealing layer; and
    a window run-in section supported on a main web via a spring web;
    wherein the window run-in section, the spring web and the main web bound a further hollow chamber.

8. The sealing profile according to claim 1, wherein the soft elastic sealing layer is two to four times a thickness of the supporting layer.

9. The sealing profile according to claim 1, wherein the soft elastic sealing layer includes cellular rubber.

10. The sealing profile according to claim 1, wherein the soft elastic sealing layer is arranged and supported directly on the harder supporting layer in a planar manner substantially along an entire width of the soft elastic sealing layer.

11. A sealing profile arrangeable between a body of a motor vehicle and a moveable window, comprising:
    a receiving groove arranged to receive an edge side of the window that interacts with the sealing profile during closure of the window, a deformable profiled section having a continuous surface that forms the groove configured to be subjected to deformation by the edge side of the window until the sealing profile obtains a final shape, the deformable profiled section including an integral layer structure of two layers deformable by the edge side of the window, the two layers having a soft elastic sealing layer on a first side of the deformable profiled section facing the window edge and a harder supporting layer on a second side of the deformable profiled section opposite the first side of the deformable profiled section and facing away from the window edge, the soft elastic sealing layer arranged and supported directly on the harder supporting layer along an entire width of the deformable profiled section.

12. A sealing profile between a body of a motor vehicle and a moveable window, comprising:
    a window run-in section supported on a main web via a spring web; and
    a receiving groove into which an edge side of the window that interacts with the sealing profile enters during closure of the window, a deformable profiled section having a continuous surface that forms the groove configured to be subjected to deformation by the edge side of the window until the sealing profile obtains a final shape, the deformable profiled section including two layers deformable by the edge side of the window, the two layers including a soft elastic sealing layer on a first side of the deformable profiled section facing the window edge and a harder supporting layer on a second side of the deformable profiled section opposite the first side of the deformable profiled section and facing away from the window edge, the soft elastic sealing layer arranged and supported directly on the harder supporting layer along an entire width of the deformable profiled section, said window run-in section made from the same material as the harder supporting layer.

13. The sealing profile according to claim 1, wherein the width of the deformable profiled section is substantially perpendicular to a direction of closure of the window.

14. The sealing profile according to claim 11, wherein the width of the deformable profiled section is substantially perpendicular to a direction of closure of the window.

15. The sealing profiled according to claim 12, wherein the width of the deformable profiled section is substantially perpendicular to a direction of closure of the window.

* * * * *